United States Patent [19]

Dodin et al.

[11] 4,310,608

[45] Jan. 12, 1982

[54] SEPARATOR INCORPORATING LIQUID LAYER

[75] Inventors: Mark G. Dodin; Allen Charkey, both of Brookfield, Conn.

[73] Assignee: Energy Research Corporation, Danbury, Conn.

[21] Appl. No.: 204,645

[22] Filed: Nov. 6, 1980

[51] Int. Cl.³ .............................................. H01M 2/16
[52] U.S. Cl. .................................... 429/131; 429/136; 429/249
[58] Field of Search .............. 429/136, 139, 140, 141, 429/247, 249, 129, 131; 210/511

[56] References Cited

U.S. PATENT DOCUMENTS

| | | | |
|---|---|---|---|
| 3,013,100 | 12/1961 | Mendelsohn et al. | 429/139 |
| 3,351,495 | 11/1967 | Larsen et al. | 429/252 |
| 4,215,186 | 7/1980 | Jaeger | 429/139 |
| 4,218,275 | 8/1980 | Kadija et al. | 429/139 |

*Primary Examiner*—Anthony Skapars

[57] ABSTRACT

A separator for an electrochemical cell comprising a container having opposing sides each formed from a layer of solid microporous material and a liquid polymer solution disposed within the container between said layers.

16 Claims, 3 Drawing Figures

SEPARATOR INCORPORATING LIQUID LAYER

BACKGROUND OF THE INVENTION

This invention relates to separators for use in electrochemical cells and, in particular, for use in electrochemical cells having a zinc electrode.

As is known, the cycle life of alkaline batteries employing zinc electrodes such as, for example, nickel-zinc, silver-zinc and manganese dioxide-zinc, is limited by a number of factors. One primary factor is shorting of the battery electrodes which results from the growth of zinc dendrites. These dendrites produce tree-like conductive branches which eventually penetrate the battery separator to provide a conductive path between positive and negative electrodes, thereby shorting same. Another factor limiting battery life is so called "shape change" of the zinc electrode. Shape change is the phenomenon of movement of the zinc active material from the electrode edges to the electrode center, thereby significantly reducing the electrode surface area available for electrochemical reaction.

As is known, the degree of dendritic growth and the degree of shape change occurring in an alkaline battery are a function of the battery separator. Conventional battery separators typically comprise one or more layers which are selected to be compatible with the cell electrolyte. These layers are also selected to be sufficiently permeable to allow the passage of electrolyte ions, but not so highly permeable as to readily permit the passage of other materials, e.g., electrode derived conductive substances. Separators of this type usually contain at least one layer of membranous material (i.e., a material having a permeability of about $5 \times 10^{-3}$ mole/(min $\times$ in$^2$) or less. A typical membranous material might be cellophane. Another type of membranous material might be the material disclosed in U.S. Pat. No. 3,351,495. Such membranous materials are found to significantly inhibit dendritic growth but are not as effective in inhibiting electrode shape change which still can occur and eventually result in battery failure.

A further separator construction has been proposed wherein the separator comprises a blend of a polyamide (e.g., Elvamides), a significantly lower pore size polymeric constituent (e.g., polyethylene oxide) and a zinc reactive material (e.g., cerium dioxide). In this separator, while the polymeric constituent acts to inhibit dendritic growth akin to the above-described membranous materials, the polyamide constituent provides sufficient permeability to significantly retard shape change. The resultant separator is thus said to prevent both zinc dendritic growth and electrode shape change.

While the separators described above have provided a degree of extended battery life, research is still being conducted for separators which can extend battery life still further.

It is an object of the present invention to provide a separator for an alkaline battery which enables longer cycle life than heretofore obtainable.

It is further object of the present invention to provide an alkaline battery separator which further retards dendritic growth and electrode shape change.

SUMMARY OF THE INVENTION

In accordance with the principles of the present invention, the above and other objectives are realized in a separator construction comprising a container having opposing sides each comprised of a layer of solid microporous material and a liquid polymer solution situated in the space between the container layers. In use, the container layers are disposed adjacent to the electrode of an electrochemical cell so that there is created at least a layer of solution and a layer of solid microporous material outward of the electrode surfaces. The polymer solution acts as relatively a low permeability (i.e., less than about $5 \times 10^{-4}$ mole/(min.in$^2$) membranous layer preventing dendritic growth, while the solid microporous material acts as a relatively high permeability (i.e., greater than about $5 \times 10^{-4}$ mole/min.in$^2$) layer inhibiting shape change.

Useable solid microporous materials are those which are mechanically and chemically stable in the cell environment, permit the desired degree of ionic flow and are able to support the polymer solution. The latter, in turn, is of a type which does not precipitate in the cell environment, is useable without detriment to cell performance and is incapable of dissolving the solid microporous support material.

DESCRIPTION OF THE DRAWINGS

The above and other features and aspects of the present invention will become more apparent upon reading the following detailed description in conjunction with the accompanying drawings in which.

DETAILED DESCRIPTION

Figure 1:
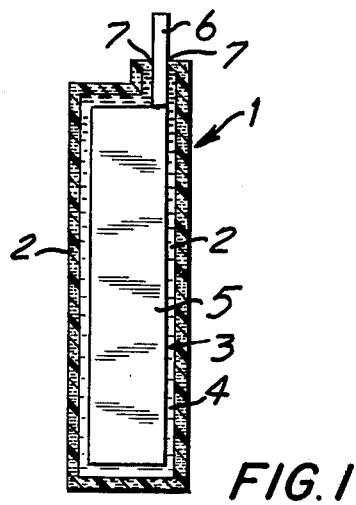
FIG. 1 depicts a first separator construction in accordance with the principles of the present invention.

In FIG. 1, a separator 1 comprises layers 2 of solid microporous material. The layers 2 form opposite sides of a container defining a containment or reservoir region 3 for receiving a membranous liquid polymer solution 4. Disposed within the polymer solution and in adjacent relationship to the layers 2 is an electrode 5 which typically might be the negative zinc electrode of a nickel-zinc alkaline battery. A connecting tab 6 extends outward from the electrode 5 between the layers 2. The interface regions 7 between the layers 2 and tab 6 are sealed so that the formed container and, therefore, the region 3 are fully closed to inhibit flow of the solution 4 from the region.

Figure 2:
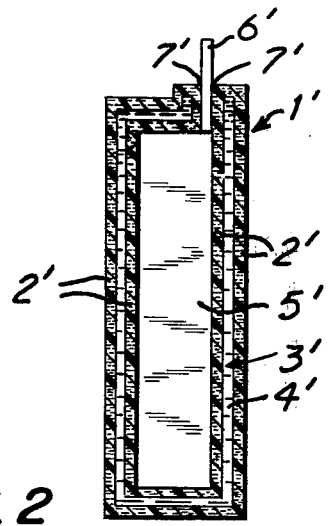
FIG. 2 depicts a second separator construction in accordance with the principles of the present invention.

An alternate construction might be as shown in FIG. 2 wherein the sealed layers 2' of the separator 1' form opposite sides of a container defining a fully closed containment region 3'. In this case, one of the layers 2' is disposed against the flat surfaces of the electrode 5' and is sealed to the periphery of such surfaces. This layer is also sealed to the electrode tab 6' at the interfaces 7'. There is thus formed outward of the electrode 5' a layer of microporous material 2', a layer of liquid polymer solution 4' and a further layer of microporous material 2', as opposed to the configuration of FIG. 1 wherein there is only a layer of liquid polymer solution 4 and a layer of microporous material 2 outward of the electrode surfaces.

Figure 3:
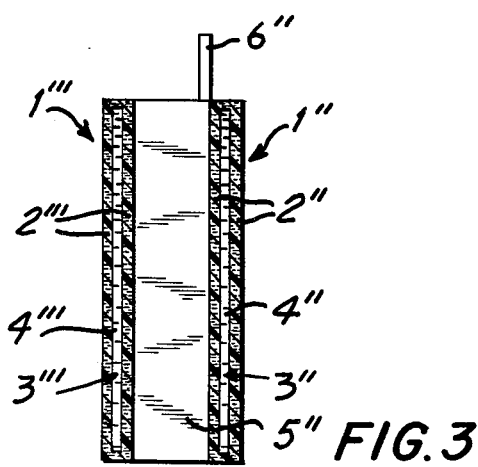
FIG. 3 depicts a third separator construction in accordance with the principles of the present invention.

Another separator construction might be as shown in FIG. 3 wherein the separators 1" and 1''' comprising respective layers 2" and 2''' form two separate containers holding corresponding liquid polymer solutions 4" aand 4'''. In this configuration, one layer of each container is adjacent and sealed to the periphery of one of the surfaces of the electrode 5", and neither container extends to the electrode tab 6".

While FIGS. 1 to 3 show the polymer solution as free flowing, the solution can also be disposed in its respective container in an immobilized state as by incorporating the solution in a bibulous or porous support material and disposing same in the container. Typical, support materials for this purpose might be non-woven polyamides, non-woven polypropylene rayon felt, cotton batting, asbestos matting and potassium titanate papers.

In general, the microporous layers can be comprised of an organic or inorganic material capable of providing chemical and mechanical stability for the separator in the electrochemical cell environment. Furthermore, the layers should be capable of providing the desired degree of ionic flow, while also compatibly supporting the polymer solution. Preferably, the layers are in the form of a microporous polymer based film having a substantially uniform pore distribution. Suitable organic microporous polymer films are nylon, polyethylene, polypropylene and polyvinyl chloride, while suitable inorganic microporous films are $CeO_2$, $ZrO_2$, Alumina, potassium titanate, etc.

The polymer solution should, in general, be compatible with the cell environment and resistant to oxidation. The solution should also be insoluble in the cell electrolyte and not precipitate in the cell environment. Furthermore, the solution should be incapable of affecting the material of the microporous layers. Preferably, the solvent for the solution should be the same as that employed in the electrolyte of the electrochemical cell. Preferable polymers for the solution are hydrophylic polymers which readily go into solution and have a relatively low internal resistance to electrolyte flow. Suitable polymers meeting these requirements are cellulosic polymers, vinyl acetate, polyvinyl alcohol, and polyethylene oxide.

A polymer solution found useable with a nylon based film as the microporous layer is an aqueous solution of polyethylene oxide. A further solution found useable with such films is an aqueous solution of polyvinyl alcohol, the latter being combined with a cross-linking constituent to increase chemical stability of the solution.

As above-indicated, the microporous layers of the separator of the invention function to contain the polymer solution while also acting to uniformly distribute the ionic flow. The polymer solution, on the other hand, functions as a membranous layer which allows ready flow of the electrolyte ions, while retarding flow of electrode originating solid materials and ions. The result is an overall separator which prevents dendritic growth in the electrochemical cell, while simultaneously inhibiting shape change of the electrode.

The polymer solution provides the additional function of reducing current density differences which arise due to any shape change that might occur in the associated electrode. Thus, the liquid solution redistributes itself as a result of such shape change, becoming thicker in areas of the electrode which have become thinner (usually the electrode edges) and thinner in areas which have become thicker (usually the electrode center). This redistribution effect also acts to reduce any pressure created between the associated electrode and its adjacent electrodes as a result of shape change.

The following table illustrates the operation of nickel zinc cells employing separator configurations in accordance with the invention and, for comparison, provides performance data of cells employing commercially available separators (i.e., items 1 and 2).

THEORETICAL ZINC CAPACITY (AH) = 14.4 AH
ELECTRODE SIZE: H - 3⅞" ± 1/16"   DISCHARGE = 2.5A × 1 hr.
W - 2⅞" ± 1/16"   CHARGE/DISCHARGE RATIO (%) = 120%
T - .07" ± .002"

| ELECTRODE TYPE & NO. | SEPARATOR CONFIGURATION | CYCLE | FAILURE MODE | COMMENTS |
| --- | --- | --- | --- | --- |
| 2 Rolled Ni 1 Zinc ZnO - 93% CdO - 5% TFE - 2% | One layer of K-307 (Celgard) on negative plate (polypropylene coated from two sides by cellulose acetate). | 120 | Shape change | Seperator looks good. There were no pinholes. Separator was somewhat brittle and there was shape change in zinc plate. |
| 2 Rolled Ni 1 Zinc ZnO - 93% CdO - 5% TFE - 2% | Two layers of K-307 (Celgard) on negative plate and pellon on the positive and negative plates | 120 | Shape change | Separator looks somewhat brittle but still good. There was shape change and too much zinc goes through separator. |
| 2 Rolled Ni 1 Zinc ZnO - 93% CdO - 5% TFE - 2% | Two layers of nylon with (PVA + BA) solution inside on negative plate. Pellon on the positive and negative plates. | 440 | Shape change | Separator looks good. There were no pinholes and dendrites. |
| 2 Rolled Ni 1 Zinc ZnO - 93% CdO - 5% TFE - 2% | Two layers of nylon on negative plate. Polyox solution inside the nylon. | 310 | Shape change | Seperator looks good. Two small dendrites grew through the separator. |
| 2 Rolled Ni 1 Zinc ZnO - 93% CdO - 5% Cd0 - 5% TFE - 2% | Two layers of nylon with (PVA + BA) solution inside on negative plate. Pellon on the positive and negative plates. | 301 | Shape change | There was shape change of zinc electrode. All zinc remains on the lower half of plate. There were some pinholes. |

As can be seen from Table I, cells employing separators in accord with the invention exhibited a cycle life of 2 to 2.5 times that exhibited by cells with commercial separators under the same charge and discharge test conditions.

The following Examples further illustrate specific separators constructed in accordance with the invention.

EXAMPLE 1

In this example, the separator comprised a microporous nylon based film. The polymer solution was a polyvinyl alcohol dissolved in water. The polyvinyl alcohol was a 99–100% hydrolyzed polymer sold by J. T. Baker Chemical Company and the concentration of the polymer was 10% of the solution by weight.

The microporous film was prepared by blending a polyamide polymer sold under the name Elvamide 8064 (manufactured by E. I. DuPont), a polyolefin oxide sold under the trade name Polyox WSR 301 and having a molecular weight of 4,000,000, cerium dioxide and a wetting agent sold under the trade name Victawet. The blend contained the following amounts of these constituents.

60% by weight Elvamide 8064
20% by weight Polyox WSR-301
12% by weight Victawet
8% by weight cerium dioxide Methanol was employed as the solvent for the Elvamide and Polyox, each being dissolved in methanol separately. The required quantity of cerium dioxide and Victawet were blended with methanol and subjected to ultrasonic blending. All parts were then mixed together and the resultant mixture or solution cast on a metal sheet using a doctor blade. The cast film or sheet was then oven dried at 60° C. and a resultant sheet of 2 mils thickness obtained. The film was then removed from the plate.

Two layers of the film were heat sealed to form a sleeve which was situated over the zinc electrode of a Ni-Zn cell. The lower edges of the layers were then heat sealed to form an enclosed bag. The aqueous polyvinyl alcohol solution was then placed into the bag encompassing the electrode, the thickness of the solution being about ⅛ of an inch. The Ni-Zn cell was then life-cycle tested under normal conditions. Cycle life of the cell was 286 cycles.

EXAMPLE 2

The procedure of Example 1 was followed utilizing a polyvinyl alcohol which was 85–89% hydrolyzed and a solution thickness of about 1/16 of an inch. Cycle life of the cell was 298 cycles.

EXAMPLE 3

The procedure of Example 1 was followed utilizing a 99–100% hydrolyzed polyvinyl alcohol mixed with boric acid and Dimethylol urea, each being about 10% by weight of the alcohol. Both the boric acid and dimethylol urea served as crosslinking agents and increased chemical stability of the solution. The thickness of the solution layer was about 0.04 inches. Cycle life of the cell was 440 cycles.

EXAMPLE 5

The procedure of Example 1 was followed using as the polymer a polyethylene oxide which is sold under the trade name Polyox WSR 301 and which has a molecular weight of 4,000,000. The concentration of polyethylene oxide was about 5% by weight of the acqu ous solution and the thickness of the solution layer was 1/16 of an inch. Cycle life of the cell was 310 cycles.

In all cases, it is understood that the abovedescribed arrangements are merely illustrative of the many possible specific embodiments which represent applications of the present invention. Numerous and varied other arrangements can readily be devised in accordance with the principles of the present invention without departing from the spirit and scope of the invention. Thus, for example, the separator may contain multiple solid microporous layers akin to the layer 2 and the layer 2 may further comprise different types of microporous materials which are heat sealed to form the composite container.

What is claimed is:

1. An electrochemical cell comprising:
   positive and negative electrodes;
   a separator for separating said electrodes comprising:
   a container comprised of a microporous material; and
   a liquid polymer solution disposed in said container.

2. An electrochemical cell in accordance with claim 1 wherein:
   said container has opposing sides each comprised of a layer of said material.

3. An electrochemical cell in accordance with claim 2 wherein:
   said container is in adjacent relationship to one of said electrodes.

4. An electrochemical cell in accordance with claim 3 wherein:
   said one electrode is disposed within said container between said layers.

5. An electrochemical cell in accordance with claim 3 wherein:
   said one electrode is disposed exterior of said container, a layer of said container being connected to the periphery of said one electrode.

6. An electrochemical cell in accordance with 1 further comprising:
   an electrolyte disposed between said electrodes.

7. An electrochemical cell in accordance with claim 6 wherein:
   said polymer solution is insoluble in said electrolyte.

8. An electrochemical cell in accordance with claim 6 wherein:
   said polymer solution is non-oxidizable when in said cell.

9. An electrochemical cell in accordance with claim 6 wherein:
   said polymer solution is non-precipitating when in said cell.

10. An electrochemical cell in accordance with 6 wherein:
    said material is stable in said electrolyte.

11. An electrochemical cell in accordance with claim 6 wherein:
    said polymer solution contains as a solvent the solvent contained in said electrolyte.

12. An electrochemical cell in accordance with claim 11 wherein:
    said solvent is water.

13. An electrochemical cell in accordance with claim 1 wherein:
    said polymer in said polymer solution is selected from the group consisting of cellulosic polymers, vinyl acetate, polyvinyl alcohol, and polyethylene oxide.

14. An electrochemical cell in accordance with claim 1 wherein:
said material is a polymer based film.

15. An electrochemical cell in accordance with claim 1 wherein:
said film is selected from the group consisting of nylon, polyethylene, polypropylene and polyvinyl chloride.

16. An electrochemical cell in accordance with claim 1 further comprising:
a porous support containing said polymer solution and disposed in said container.

* * * * *